United States Patent
Kingston

[15] 3,671,849
[45] June 20, 1972

[54] THREE-PHASE POWER CONTROLLER

[72] Inventor: Floyd E. Kingston, 2282 Columbia St., Palo Alto, Calif. 94306

[22] Filed: June 21, 1971

[21] Appl. No.: 154,898

[52] U.S. Cl..............................323/24, 307/252 T, 323/21
[51] Int. Cl.....................................................G05f 1/40
[58] Field of Search...................323/21, 24; 321/16, 24; 307/252 T

[56] References Cited

UNITED STATES PATENTS

| | | | |
|---|---|---|---|
| 3,307,094 | 2/1967 | Ogle | 323/24 X |
| 3,453,063 | 7/1969 | Lewis | 323/24 |
| 3,562,625 | 2/1971 | Van Den Broek | 323/24 X |
| 3,577,177 | 5/1971 | Hewlett | 323/24 |
| 3,579,096 | 5/1971 | Buchanan | 323/24 X |
| 3,611,017 | 10/1971 | Freeland | 323/21 X |
| 3,611,097 | 10/1971 | Joslyn | 323/24 |

OTHER PUBLICATIONS

IBM Technical Disclosure Bulletin, "Zero Crossover Current Sensor," Vol. 11, No. 5, p. 501, Oct. 1968.

*Primary Examiner*—William H. Beha, Jr.
*Attorney*—Harry E. Aine et al.

[57] ABSTRACT

A three-phase power controller for controlling three-phase power to a non-unity power factor load is disclosed, which employes a separate bidirectional gate in series with each of the lines to the three-phase load for gating the load current to the load. Each bidirectional gate includes a master gate and a slave gate slaved to the master gate. A synchronous control circuit supplies a sequence of gating on signals to the respective gates. The synchronous control circuit includes a zero-crossing sensor for sensing the alternating potential supplied across each set of power supply terminals and a particular half-cycle sensor for sensing the particular half-cycle of each of the alternating potential applied across each respective set of power supply terminals. Light emitting diodes and photo detectors are employed in various ones of the gating control channels to provide high voltage isolation between the gates and the circuits generating the gate control signals.

10 Claims, 5 Drawing Figures

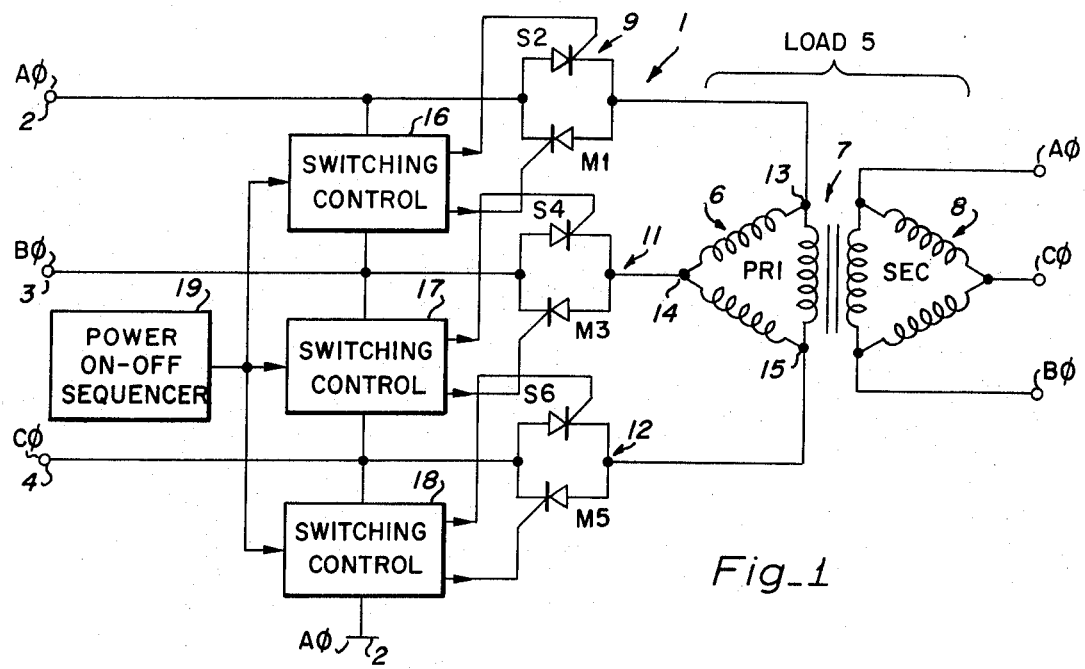
Fig_1
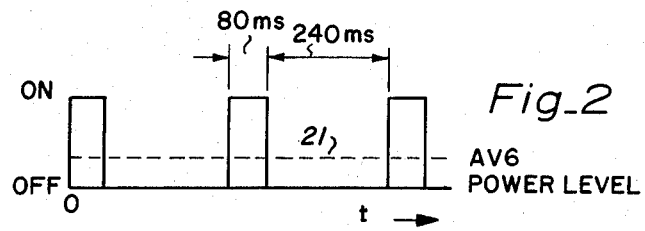
Fig_2
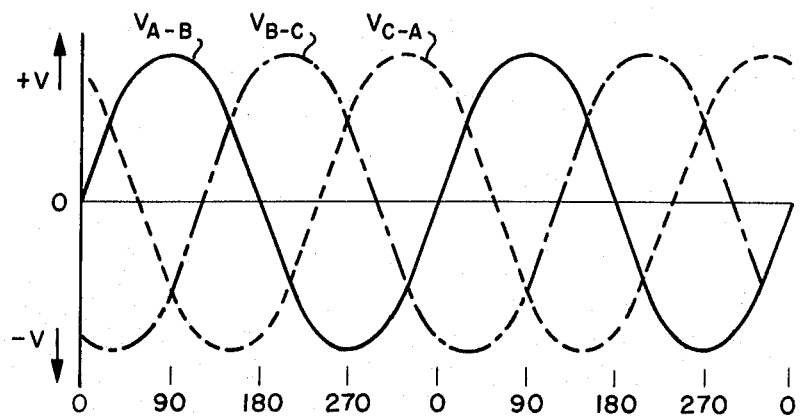
Fig_3
INVENTOR.
FLOYD E. KINGSTON

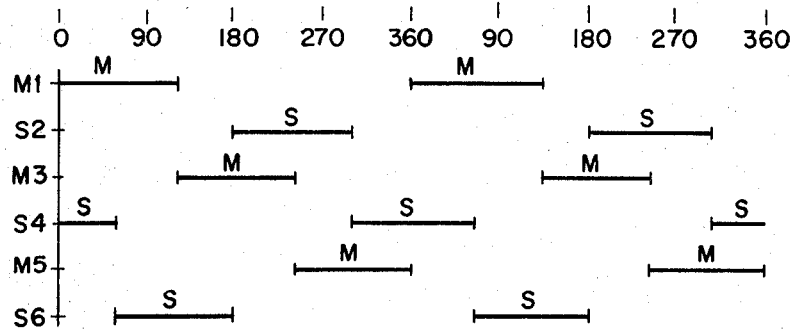
Fig_4
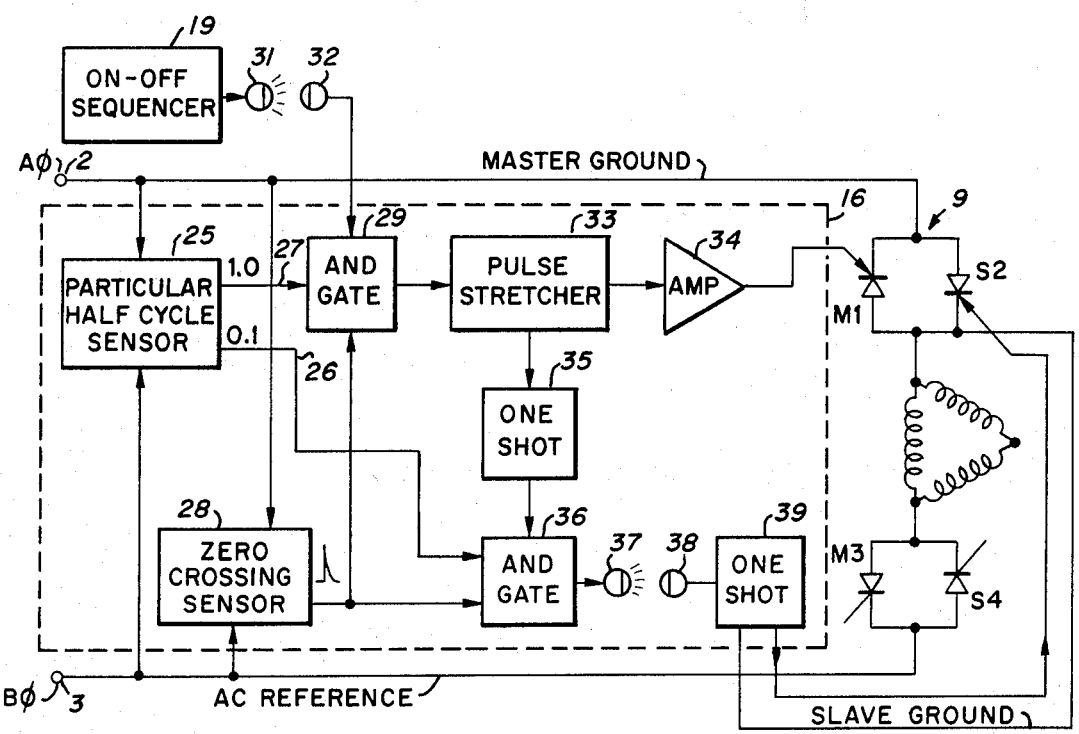
Fig_5
INVENTOR.
FLOYD E. KINGSTON
ATTORNEY

THREE-PHASE POWER CONTROLLER

DESCRIPTION OF THE PRIOR ART

Heretofore, attempts have been made to control three-phase power to a non-unity power factor load by means of triac type bidirectional gates or back to back connected pairs of SCR's connected in series with each of the three-phase input lines to the three phase load. The problem with this arrangement has been that transient currents generated in the load produce reference voltage interference which prevents the triacs or SCR's from operating properly and as a result the triacs or SCR's do not shut off when desired.

Silicon control rectifiers parallel connected in reverse polarity have been employed as bidirectional gates for gating single phase power to a non-unity power factor load. In such circuits, a zero crossing of the current supplied to the load is sensed by measuring the voltage build up across the gate and synchronous gate signals are generated for gating the bidirectional connection of silicon control rectifiers, such that the gates are opened at a zero crossing of the current supplied to the non-unity power factor load. Such a circuit is disclosed in U.S. Pat. No. 3,486,042 issued Dec. 23, 1969. However, an extension of such single phase synchronous switching circuits to control of three phase power to a three-phase load becomes substantially more complicated, due to the mutual coupling between the various windings of the three-phase load, such that a sensing of the current fed to the load to derive the synchronous gating control signals to the bidirectional gates becomes impractical in use.

SUMMARY OF THE PRESENT INVENTION

The principal object of the present invention is the provision of an improved three phase power controller.

In one feature of the present invention, bidirectional gates are provided between the three-phase power supply and the three phase load in series with each of the input lines for gating the load current to the load. Each gate includes a master gate and a slave gate. A synchronous control circuit means is provided for generating gate signals supplied to the respective master and slave gates. The synchronous control circuit includes a zero crossing sensor and a particular half-wave cycle sensor for sensing the potential applied between respective sets of input terminals to derive the master and slave gate control signals.

In another feature of the present invention, light emitting means and light detecting means are provided in series with the flow of the synchronous gating control outputs to their respective bidirectional gates for providing high voltage isolation between the bidirectional gates and their respective synchronous control circuit.

In another feature of the present invention, light emitting means and light detecting means are series connected in circuit with the flow of control signals to the synchronous control circuit means for providing high voltage isolation between the respective synchronous control circuit and an on-off control which controls the duty factor of the power controller.

Other features and advantages of the present invention will become apparent upon a perusal of the following specification taken in connection with the accompanying drawings, wherein:

BRIEF DESCRIPTION OF THE DRAWINGS

FIG. 1 is a schematic circuit diagram, partly in block diagram form, of a three phase power controller incorporating features of the present invention, FIG. 2 is a plot of power controller on time vs. power controller off time depicting a duty cycle for the power controller of FIG. 1, FIG. 3 is a plot of three phase voltage waveforms for two electrical cycles, FIG. 4 is a plot of the gate signal on pulses applied to the respective ones of the gates of FIG. 1 for gating power to the three-phase load, and FIG. 5 is a schematic circuit diagram, partly in block diagram form, showing a synchronous gate control circuit for gating one bidirectional gate in the circuit of FIG. 1.

DESCRIPTION OF THE PREFERRED EMBODIMENTS

Referring now to FIG. 1, there is shown a power controller 1 incorporating features of the present invention. The power controller 1 includes three input terminals 2, 3 and 4 for connection to the corresponding three output power terminals of a three phase alternating current power supply, not shown. Terminal 2 will be identified as having A phase power supplied thereto, terminal 3 having B phase power, and terminal 4 having C phase power supplied thereto, where the phase shift between A, B and C phase is each 120°. The potential supplied across terminals 2 and 3 corresponding to $V_{A-B}$, whereas the potential applied between terminals 2 and 4 corresponds to potential $V_{C-A}$, all depicted in FIG. 3.

Three phase power supplied across terminals 2, 3 and 4 is applied to a three phase non-unity power factor load 4, such as the Δ wound primary 6 of a three phase transformer 7 with the Δ wound secondary winding 8 producing corresponding A-phase, C-phase and B-phase outputs supplied to another load such as a full wave bridge rectifier, not shown, for delivering DC current to a suitable load.

Power is gated to the load 5 via the intermediary of three bidirectional gates 9, 11 and 12 connected in series between respective terminals 2, 3 and 4 and their respective terminals 13, 14 and 15, respectively, of the primary winding. Each of the bidirectional gates 9, 11 and 12 includes a master gate such as M–1, M–3, and M–5 having a polarity such as when opened by a bias potential to conduct current toward the respective A-phase, B-phase and C-phase terminal 2, 3 and 4 of the power supply. Each of the directional gates 9, 11 and 12 also includes a slave gate S2, S4, and S6, respectively, having a polarity for gating current away from the respective A-phase, B-phase and C-phase terminal of the power supply.

Synchronous switching control circuits 16, 17 and 18 are provided connected across respective pairs of the terminals for sensing the applied potentials $V_{A-B}$, $V_{B-C}$, and $V_{C-A}$, respectively, and for delivering a sequence of gating on signals to the respective pair of master and slave gates in accordance with the sequence as shown in FIG. 4. More particularly, the gating on signals have a duration of approximately 120° with each gate being gated on once during each complete cycle of the three phase power supplied across terminals 2, 3 and 4.

The respective synchronous switching control circuit senses the potential applied across its respective set of terminals from the power supply and generates at the zero crossing of the applied potential, a first gating on control signal fed to the respective master gate for controlling the gate. The master control signal is on for 120° to assure that it will on when the current, which lags the applied potential in an inductive load, crosses from a minus into a plus direction such that the master gate becomes conductive at the zero crossing of the current, whereby radio frequency interference and undesired transients are avoided.

The synchronous switching control circuit also generates a slave gating on control signal which follows by 180° the master gating control signal for application to the respective slave gate for gating the current through the slave gate in the opposite direction to that of its corresponding master. The slave gate has the gating on signal applied thereto for 120° such that when the current reverses and is directed in the direction of conduction of the slave gate the slave gate will begin conducting current at the zero crossing of the current to prevent unwanted transients and interference, as with the master. The slave is gated on only if the master has been previously gated on. In this manner, complete cycles of current pass through each winding of the transformer or load to prevent unwanted DC currents and subsequent heating of the primary winding of the load.

The respective synchronous switching control circuits 16, 17 and 18 are gated on and off by means of a power on-off sequencer 19 which serves to gate the three phase power to the load in accordance with the desired pulse repetition rate to obtain a desired average power level or to produce a certain pulsed output within the load. For example, as shown in FIG. 2, the power on-off sequencer may gate the synchronous switching control circuits on for 80 milliseconds followed by a 140 millisecond off period to produce a much lower average power level as indicated by dotted line 21. By changing the duty factor of the power sequencer 19, the power factor or average power level produced in the load 5 is correspondingly changed.

Referring now to FIG. 5, there is shown a synchronous switching control circuit 16 as connected for gating the three phase power through A-phase gate 9. The synchronous switching control circuit 16 includes a particular half-cycle sensor 25, such as a bi-stable multivibrator or flip-flop connected across terminals 2 and 3 for sensing the applied potential $V_{A-B}$. The half-cycle sensor 25 has two outputs 26 and 27. Each output 26 and 27 is a binary code either a 0 to a 1 depending upon whether the applied potential $V_{A-B}$ is in a positive half-cycle or a negative half-cycle. For example, when the applied potential is in the positive half-cycle the output is 1. When it is in a negative half-cycle the output is 0.

A zero crossing sensor 28 is also connected across terminals 2 and 3 for sensing when the applied potential $V_{A-B}$ crosses through a 0. The zero crossing sensor can be of the same type as disclosed in the aforecited U.S. Pat. No. 3,486,042 and produces a pulse output each time the applied voltage passes through 0.

The output of the zero crossing sensor 28 is fed to a first AND-gate 29 for anding with output 27 of the particular half cycle sensor 25 and with an output derived from the on-off sequencer 19. A light emitting diode 31 and photo detector transistor 32 are connected in series with the output of the on-off sequencer 19 and the AND-gate 29 to provide high voltage isolation between the on-off sequencer 19 and the synchronous switching control circuit 16.

When the applied potential $V_{A-B}$ is positive and the zero crossing sensor 28 senses a crossing and the on-off sequencer 19 is supplying a signal for turning on the power to the three phase load 5, the AND-gate 29 produces an output which is applied to a pulse stretcher 33 for stretching the output to a pulse of approximately 120° duration and preferably greater than 30° duration in order to account for the current lag in an inductive load. The output of the pulse stretcher 33 is fed to an amplifier 34 and thence applied to the control input of the master gate M1 such that the master gate will conduct current toward the A-phase terminal 2 when the load current, which lags the applied voltage by some number of degrees depending upon the power factor of the load, passes through zero and reverses its flow toward the A-phase terminal 2.

The slave gate S2 is slaved to the master gate $M_1$ via an output derived from the pulse stretcher 33 and fed via a one shot multivibrator 35 to one input of a second AND-gate 36 for anding with the output of the zero crossing sensor 28 and the second output 26 of the particular half-cycle sensor 25. The one shot multivibrator 35 has a pulse duration of slightly more than 180° of electrical phase at the operating frequency of the load such that when a master gating on signal has been produced, the one shot multivibrator 35 will have an input to AND-gate 36 180° later.

This slave gate output of the second AND-gate 36 is fed via light emitting diode 37 and photodetecting transistor 38 to one input of a one shot multivibrator 39 for generating the slave gate on signal of a duration of 120 electrical degrees for gating on the slave gate S2 180° after the master gate $M_1$ has been gated on. The light emitting diode 37 and photodetecting transistor 38 serve to provide high voltage isolation between the remaining portion of the synchronous switching control circuit 16 and the slave gate S2, whereby the major portion of the circuitry of the synchronous switching control circuit 16 can be operated at an ac ground potential corresponding to the A-phase potential.

Synchronous switching control circuit 16 is grounded to A$\phi$, and circuit 17 is grounded to B$\phi$ and synchronous switching control circuit 18 is grounded to C$\phi$. Each of the synchronous switching control circuits 16, 17 and 18 is similar to that of the A-phase synchronous switching control circuit 16. The respective ac reference signal is derived from B$\phi$ terminal 3 for control circuit 16, from C$\phi$ terminal 4 for control circuit 17, and from A$\phi$ terminal 2 for control circuit 18.

The advantage to the three phase power controller 1 of the present invention is that it provides zero crossing switching for the three-phase load current to reduce radiofrequency interference and unwanted transients. In addition, the power controller 1 will provide rapid on and off switching of the three phase power as indicated in FIG. 2, and in such a manner as to provide an even number of half-cycles of current through the load in order to reduce unwanted DC current heating of the load.

What is claimed is:

1. In a power controller for controlling three-phase power to a non-unity power factor load, three power supply terminals to be connected to a source of three-phase power, means for connecting a non-unity power factor load across said three phase power supply terminals for supplying three-phase power to said load, at least three semiconductive load current carrying bidirectional gate means, each of said gate means being connected in series between a respective one of said power supply terminals and said load, each bidirectional gate means including a master gate and a slave gate for gating load current in opposite directions therethrough, synchronous control means for applying a sequence gating on signals to said respective gate means to conduct load current therethrough, means for supplying duty factor control signals to said synchronous control means for turning on and off the output of said synchronous control means as fed to said bidirectional gate means to determine the duty factor of the three phase power fed through said gate means to said load, the improvement wherein, said synchronous control means includes, means for sensing zero crossings of one of the components of alternating power applied across each respective paired set of said power supply terminals to derive respective zero crossing outputs, means for sensing a particular half-cycle of one of the components of the alternating power applied across each respective paired set of said terminals to derive respective half-cycle outputs, master gating signal generator means responsive to respective ones of said derived zero crossing outputs and respective ones of said half-cycle outputs to derive at least three respective master gating control outputs, means for feeding respective ones of said master gate control outputs to respective master gates of said bidirectional gate means for gating the load current therethrough in accordance with a predetermined master gate sequence, and means responsive to respective master gate outputs and to respective particular half-cycle outputs and to respective zero crossing outputs for deriving at least three respective slave gating control outputs, means for feeding respective ones of said slave gating outputs to respective slaves of said bidirectional gate means for gating load current through respective ones of said slave gates of said bidirectional gate means in accordance with a certain slave gating sequence.

2. The apparatus of claim 1 wherein said synchronous control means includes light emitting means and light detecting means series connected in circuit with the flow of gating control outputs to said bidirectional gate means for providing high voltage isolation between said bidirectional gate means and said means for producing said gating control output.

3. The apparatus of claim 1 including light emitting means and light detecting means series connected in circuit with the flow of control signals to said synchronous control means for providing high voltage isolation between said synchronous control means and said duty factor control signal supply means.

4. The apparatus of claim 1 wherein said semiconductive bidirectional gate means comprises a parallel connection of reverse polarity connected silicon controlled rectifiers.

5. The apparatus of claim 1 wherein said three phase non-unity power factor load is inductive, and wherein said synchronous control circuit generates said gate on control outputs which have a duration greater than 30 electrical degrees at the operating frequency of the power supplied to the three phase load, whereby compensation is obtained for the lag of the current flowing through the load in response to the applied potential.

6. The apparatus of claim 1 wherein said particular half-cycle sensor circuit means includes, bi-stable flip-flop means responsive to the potential applied across a respective pair of said power supply terminals to derive an output determinative of the particular half-cycle of such applied potential.

7. The apparatus of claim 1 wherein said means for deriving said slave gating control outputs includes, one shot multivibrator means responsive to a respective one of said master gating control outputs for generating a pulse having a duration of at least 180 electrical degrees long at the operating frequency of the power supplied to the load for comparing with said zero crossing output and said particular half-cycle output to derive at a coincidence of all three outputs, a respective one of said slave control gating outputs.

8. The apparatus of claim 5 wherein said inductive load comprises a delta wound primary winding of a three-phase transformer.

9. The apparatus of claim 1 wherein said zero crossing sensor means senses the alternating electrical potential component of the power applied across each respective paired set of said power supply terminals.

10. The apparatus of claim 1 wherein said particular half-cycle sensor means senses the alternating electrical potential component of the power applied across each respective paired set of said power supply terminals.

* * * * *